United States Patent
Nakamura et al.

(10) Patent No.: US 8,650,430 B2
(45) Date of Patent: Feb. 11, 2014

(54) ENABLING A PERIPHERAL DEVICE TO TRANSMIT A REQUEST FOR INTERRUPT PROCESSING TO A HOST WHEN NO CLOCK SIGNAL IS OUTPUT FROM THE HOST DEVICE

(75) Inventors: Masahiro Nakamura, Hyogo (JP); Tadashi Ono, Osaka (JP); Isao Kato, Osaka (JP)

(73) Assignee: Panasonic Corporation, Osaka (JP)

( * ) Notice: Subject to any disclaimer, the term of this patent is extended or adjusted under 35 U.S.C. 154(b) by 390 days.

(21) Appl. No.: 13/180,708

(22) Filed: Jul. 12, 2011

(65) Prior Publication Data

US 2012/0023358 A1   Jan. 26, 2012

(30) Foreign Application Priority Data

Jul. 23, 2010   (JP) .................................. 2010-165659

(51) Int. Cl.
  *G06F 1/00*   (2006.01)
  *G06F 13/24*   (2006.01)
(52) U.S. Cl.
  USPC ............................ 713/500; 710/260; 710/262
(58) Field of Classification Search
  USPC ........................................................ 713/500
  See application file for complete search history.

(56) References Cited

U.S. PATENT DOCUMENTS

| | | | | |
|---|---|---|---|---|
| 5,237,692 A * | 8/1993 | Raasch et al. | .................. | 710/267 |
| 6,038,633 A * | 3/2000 | Tavallaei | ........................ | 710/262 |
| 7,249,271 B2 * | 7/2007 | Shibata et al. | ................. | 713/324 |
| 7,464,195 B2 * | 12/2008 | Bland et al. | ...................... | 710/15 |
| 7,492,189 B2 | 2/2009 | Park | | |
| 7,734,938 B2 | 6/2010 | Kim | | |
| 8,099,537 B2 * | 1/2012 | Suenaga et al. | ................ | 710/106 |
| 2005/0268010 A1 * | 12/2005 | Igari | ............................. | 710/100 |
| 2006/0230206 A1 | 10/2006 | Park | | |
| 2007/0124621 A1 | 5/2007 | Kim | | |
| 2007/0162675 A1 * | 7/2007 | Sugiura et al. | ................ | 710/260 |
| 2009/0132843 A1 | 5/2009 | Park | | |

FOREIGN PATENT DOCUMENTS

| | | |
|---|---|---|
| JP | 2006-254422 A | 9/2006 |
| JP | 2007-151122 A | 6/2007 |

* cited by examiner

*Primary Examiner* — Suresh Suryawanshi

(74) *Attorney, Agent, or Firm* — Renner, Otto, Boisselle & Sklar, LLP

(57) ABSTRACT

In a communication system in which data is transmitted and received in synchronization with a clock signal, a peripheral device cannot transfer data to a host device when the host device stops outputting the clock signal and thus the peripheral device cannot promptly transmit an interrupt request to the host device. A peripheral device transmits an interrupt request to a host device using a signal line for a clock signal when the clock signal output has been stopped. The host device receives the interrupt request, and resumes outputting a clock signal to enable data transmission and reception to and from the peripheral device. This enables the peripheral device to transmit an interrupt request to the host device promptly when the output of the clock signal from the host device has been stopped.

14 Claims, 7 Drawing Sheets

FIG. 3A  Differential clock output unit 219 — Reference clock output

FIG. 3B  CLK

FIG. 3C  DAT0 — Interrupt cause identifying command packet — Processing

FIG. 3D  DAT1 — Interrupt packet — Interrupt cause identifying response packet

US 8,650,430 B2

ENABLING A PERIPHERAL DEVICE TO TRANSMIT A REQUEST FOR INTERRUPT PROCESSING TO A HOST WHEN NO CLOCK SIGNAL IS OUTPUT FROM THE HOST DEVICE

This application claims priority to Japanese Patent Application No. 2010-165659 filed on Jul. 23, 2010, the entire disclosure of which is hereby incorporated herein by reference.

BACKGROUND OF THE INVENTION

1. Field of the Invention

The present application relates to a host device that receives a request for interrupt processing, a peripheral device that generates an interrupt request and transmits the request to a host device, a communication system including a peripheral device that generates and transmits an interrupt request and a host device that receives the interrupt request, and a communication method used in such a communication system.

2. Description of the Related Art

A peripheral device connected to a host device transmits a request for interrupt processing to the host device based on an internally occurring event. The host device then receives the interrupt request. To minimize the time taken before performing the interrupt processing, the host device is required to identify the device that has transmitted the request and also the type of the interrupt request.

Patent Literature 1 describes a method for activating and deactivating the power saving mode of a first subsystem and a second subsystem that are connected to each other with differential signaling interfaces. When, for example, an interrupt occurs, one subsystem can independently deactivate the power saving mode of the other subsystem. The subsystem can deactivate the power saving mode of the other subsystem using a differential signaling interface via which a packet is transmitted. The subsystem can then subsequently transmit the interrupt request to the other subsystem.

CITATION LIST

Patent Literature

Patent Literature 1: Japanese Unexamined Patent Publication No. 2007-151122

The communication system of the present application has a data line and a clock line. The data line carries data transmitted and received by the host device and the peripheral device. The clock line carries a clock signal with which data to be transmitted and received through the data line is synchronized. The clock signal is provided from the host device to the peripheral device. When the host device transmits data to, for example, the peripheral device, the host device synchronizes the data with a clock signal output onto the clock line before transmitting the data. When the peripheral device transmits data to the host device, the peripheral device synchronizes the data with a clock signal output from the host device before transmitting the data using the data line.

However, the host device stops outputting the clock signal onto the clock line when, for example, the host device enters the power saving mode. In this state, the peripheral device cannot transmit any data to the host device. In particular, the peripheral device may need to transmit, to the host device, a request for interrupt processing to be performed by the host device. However, while no clock signal is being provided from the host device, the peripheral device using the technique described in Patent Literature 1 cannot transmit the interrupt request to the host device.

It is an object of the present application to promptly enable a peripheral device to transmit a request for interrupt processing to a host device when no clock signal is output from the host device so that the host device can perform the interrupt processing.

SUMMARY

The present technique relates to a host device that transmits, using differential signal lines including a first signal line and a second signal line, a reference clock signal to be used in transmission and reception of data to and from a peripheral device. The host device includes a differential clock output unit, an interrupt reception unit, and a clock-output and interrupt-reception control unit.

The differential clock output unit generates a reference clock signal, and outputs the generated reference clock signal onto the differential signal lines.

The interrupt reception unit detects an interrupt signal output from the peripheral device onto the first signal line when an output of the reference clock signal onto the differential signal lines has been stopped.

The clock-output and interrupt-reception control unit starts transmitting, using the differential signal lines, a reference clock signal generated by the differential clock output unit when the interrupt signal becomes undetectable by the interrupt reception unit.

In this host device, the interrupt reception unit can detect an interrupt signal output from the peripheral device onto the first signal line when the output of the reference clock signal on the differential signal lines has been stopped. This enables the host device to receive a request for interrupt processing transmitted from the peripheral device promptly as well as reliably when no clock signal is output from the host device. As a result, the host device can perform the interrupt processing in an appropriate manner.

The present invention promptly enables a peripheral device to transmit a request for interrupt processing to a host device when no clock signal is output from the host device so that the host device can perform the interrupt processing.

DETAILED DESCRIPTION OF THE PREFERRED EMBODIMENTS

First Embodiment

Figure 1:
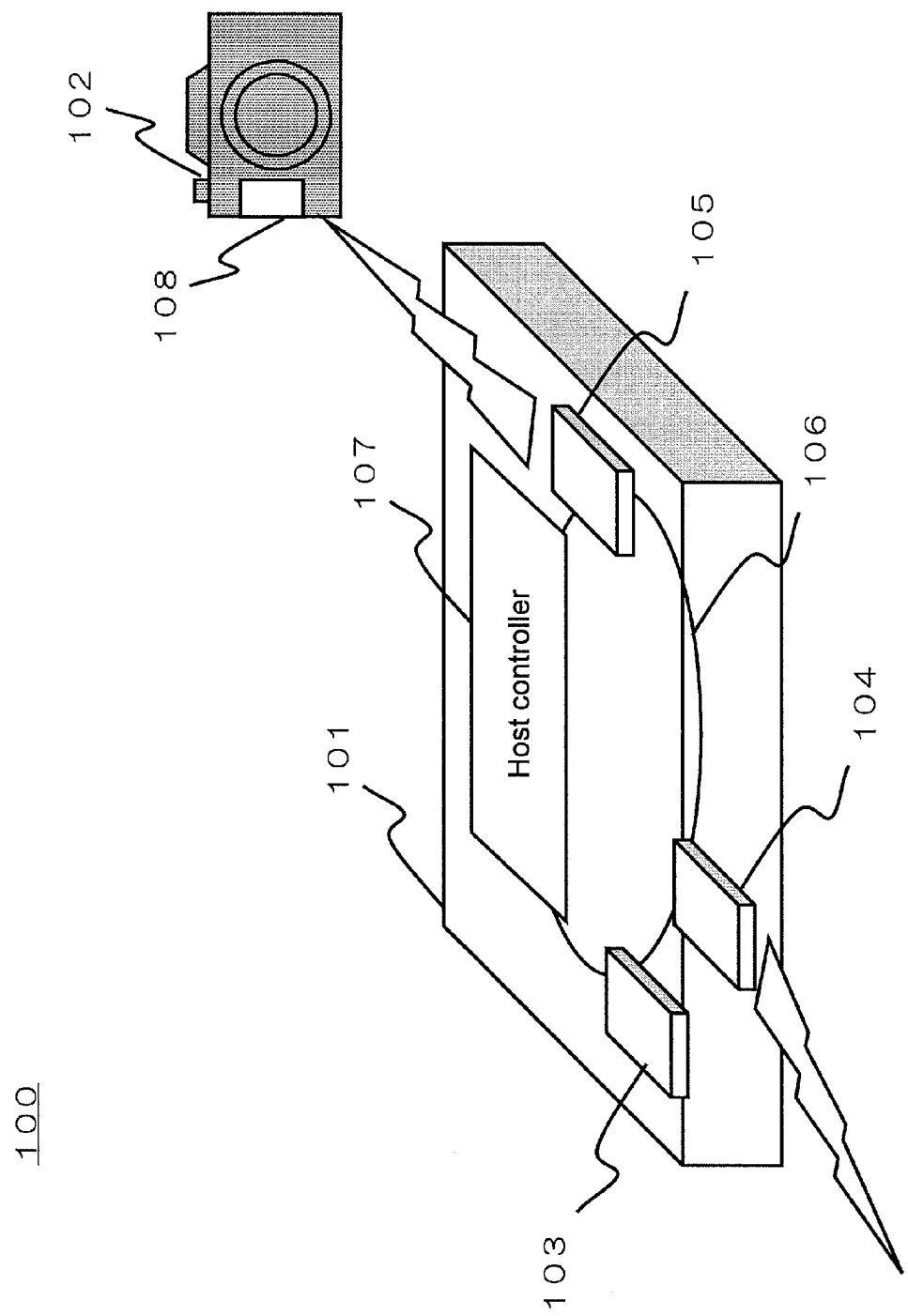
FIG. 1 shows a configuration example of a communication system according to a first embodiment.

FIG. 1 shows the configuration of a video system 100 as an example of a communication system according to an embodiment of the present application. The video system 100 shown in FIG. 1 includes a video recorder 101 and a digital camera 102. The video recorder 101 further includes a host controller 107, a built-in memory device 103, a wireless LAN device 104, and a wireless gigabit (WiGig) device 105. These components of the video recorder 101 are connected with a ring bus 106. The built-in memory device 103, the wireless LAN device 104, and the WiGig device 105 may be collectively referred to as the devices.

The WiGig refers to an interface that allows wireless transfer between proximity devices at a transfer rate of gigabits per second or higher. When the user brings the digital camera 102 into proximity of the video recorder 101, the communication between the WiGig device 108 inside the digital camera 102 and the WiGig device 105 is enabled. Once the communication is enabled, the WiGig device 105 notifies the host controller 107 that the communication has been enabled by transmitting, for example, an interrupt signal to the host controller 107.

The host controller 107 basically controls communication performed using the ring bus 106. More specifically, the host controller 107 generates and provides a synchronization signal (a reference clock signal), with which data to be transmitted and received through the ring bus 106 is synchronized. The host controller 107 and the devices cannot communicate with each other unless the reference clock signal for synchronization is output from the host controller 107.

However, the wireless LAN device 104 and the WiGig device 105 may need to transmit, promptly, at a given timing, to the host controller 107, an instruction provided from a remote device or the like (the digital camera 102 for example) to which the devices are connected. More specifically, these devices (in particular devices that accept an external input as well as perform an external output) may need to transmit an interrupt signal to the host controller 107. The host controller 107 then receives the interrupt signal. The host controller 107 is required to first identify a cause of the interrupt and then perform command processing required by the interrupt.

While a reference clock signal is constantly being output from the host controller 107, the devices can transmit an interrupt or the like to the host controller 107 by transmitting data to the host controller 107 through the ring bus 106. However, while no reference clock signal is being output from the host controller 107, the devices cannot independently transmit a request for interrupt processing to the host controller 107.

1.1 Structure of the Communication System

Figure 2:
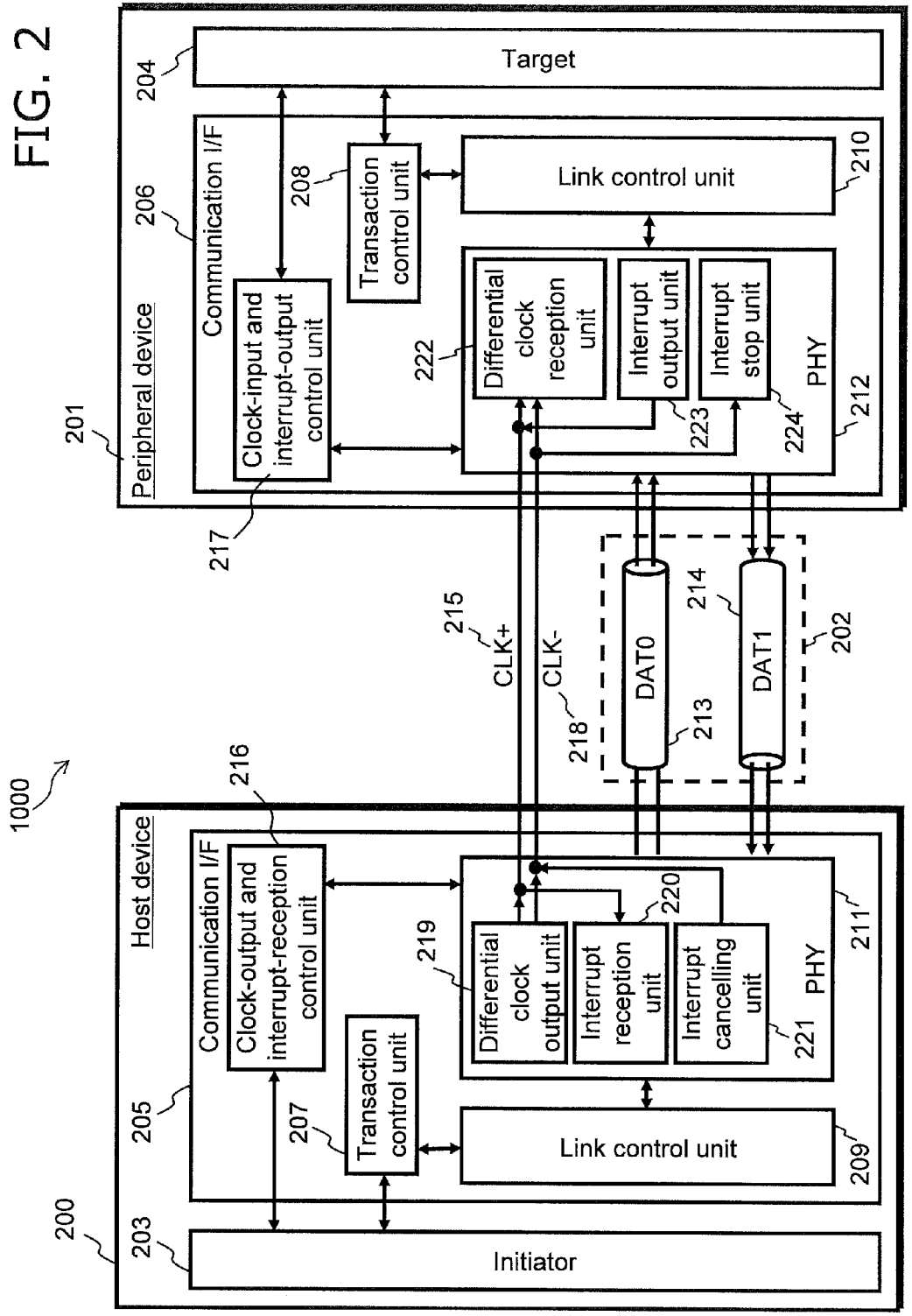
FIG. 2 is a functional block diagram showing a host device and a peripheral device according to the first embodiment.

FIG. 2 shows a block diagram schematically showing the structure of a communication system 1000 according to the present embodiment.

As shown in FIG. 2, the communication system 1000 of the present embodiment includes a host device 200, a peripheral device 201, and communication lines connecting the host device 200 and the peripheral device 201. The host device 200 and the peripheral device 201 are connected to each other with a serial communication network 202 and differential clock signal lines including at least two signal lines CLK+ 215 and CLK− 218, through which a reference clock signal is to be provided from the host device 200 to the peripheral device 201.

The serial communication network 202 includes at least two serial lines, a line DAT0 213 and a line DAT1 214 shown in FIG. 2. The line DAT0 213 is used to transmit data from the host device 200 to the peripheral device 201 (downlink) The line DAT1 214 is used to transmit data from the peripheral device 201 to the host device 200 (uplink). The use of these lines DAT0 213 and DAT1 214 enables full duplex mode communication to be performed in the communication system 1000.

The communication direction of these signal lines may be controlled by link control units 209 and 210, which will be described later, so that the data transmission directions of the line DAT0 213 and the line DAT1 214 can be variable. The use of such control enables half duplex communication to be performed in the communication system 1000.

1.1.1 Host Device

As shown in FIG. 2, the host device 200 includes an initiator 203 and a communication interface (I/F) 205.

The initiator 203 performs processing as required by the function of the host device 200. When, for example, the host device 200 is the video recorder 101 as shown in FIG. 1, the initiator 203 is typically composed of a central processing unit (CPU), a display output unit, and an image processing unit. The initiator 203 transmits and receives data to and from the peripheral device 201 using the communication I/F 205 in accordance with the processing result.

The communication I/F 205 enables communication, such as data transmission and reception, with the peripheral device 201. The communication I/F 205 includes a transaction control unit 207, a link control unit 209, a PHY unit 211, and a clock-output and interrupt-reception control unit 216.

The transaction control unit 207 includes a control register or a transmission and reception buffer for temporarily storing data to control communication with the initiator 203 (to control the transaction layer). The transaction control unit 207 generates packets in accordance with the settings of the control register or with the state of the transmission and reception buffer. More specifically, the packets generated by the transaction control unit 207 include (1) a command packet that serves as a trigger for communication, (2) a response packet carrying a response, and (3) a data packet for transmitting and receiving data.

The link control unit 209 analyzes various packets to be transmitted, determines whether a transfer error has occurred in transmission of these packets, and also controls the direction of the communication paths or the bit synchronization, or in other words, controls the data link layer.

The PHY (physical layer) unit 211 includes a differential transmitter, a coding unit, and a parallel/serial conversion unit. The differential transmitter transmits and receives serial data using the line DAT0 213 or the line DAT1 214. The coding unit codes data using, for example, 8b/10b encoding, for transferring serial data on which a high-speed clock is superimposed. The parallel/serial conversion unit converts encoded data to generate serial data. In addition to these components, the PHY unit 211 includes a differential clock output unit 219, an interrupt reception unit 220, and an interrupt cancelling unit 221 as shown in FIG. 2.

The differential clock output unit 219 outputs a reference clock signal that is transmitted in synchronization with data transmitted or received using the serial communication network 202 (for example, a reference clock signal having a clock frequency of 45 to 150 MHz) onto the differential clock signal lines including the line CLK+ 215 and the line CLK− 218.

The interrupt reception unit 220 receives an interrupt signal transmitted from the peripheral device 201 using one of the differential clock signal lines, or specifically, for example, the line CLK+ 215, which serves as a first signal line.

The interrupt cancelling unit 221 outputs an interrupt cancelling signal, which stops the interrupt signal provided from the peripheral device 201, using the other one of the differential clock signal lines, or specifically, for example, the line CLK− 218, which serves as a second signal line.

The clock-output and interrupt-reception control unit 216 controls the input and output state of the differential clock output unit 219, the interrupt reception unit 220, and the interrupt cancelling unit 221 (controls the state of their input/output terminals) in accordance with, for example, the state of the host device 200, and switches the connecting state of the differential clock output unit 219, the interrupt reception unit 220, and the interrupt cancelling unit 221 with the differential clock signal lines CLK+ 215 and CLK− 218 (controls the connection or disconnection).

For example, the clock-output and interrupt-reception control unit 216 switches the connecting state in the manner described in (1) and (2) (controls the connection or disconnection).

(1) To provide a clock signal from the host device 200 to the peripheral device 201, the clock-output and interrupt-reception control unit 216 sets the terminals of the differential clock output unit 219 connected to the differential clock signal lines CLK+ 215 and CLK− 218 to the output state, or to the state in which a clock signal can be transmitted from the differential clock output unit 219 to the peripheral device. The clock-output and interrupt-reception control unit 216 then electrically disconnects the interrupt reception unit 220 and the interrupt cancelling unit 221 from the differential clock signal lines CLK+ 215 and CLK− 218 (for example, sets the terminals of the interrupt reception unit 220 and the interrupt cancelling unit 221 connected to the differential clock signal lines CLK+ 215 and CLK− 218 to a high impedance state).

(2) When no clock signal is provided from the host device 200 to the peripheral device 201, the clock-output and interrupt-reception control unit 216 electrically disconnects the differential clock output unit 219 from the differential clock signal lines CLK+ 215 and CLK− 218 (for example, sets the terminals of the differential clock output unit 219 connected to the differential clock signal lines CLK+ 215 and CLK− 218 to a high impedance state). The clock-output and interrupt-reception control unit 216 then sets the state in which the interrupt reception unit 220 can receive a signal from the peripheral device 201 via the differential clock signal line CLK+ 215. The clock-output and interrupt-reception control unit 216 then sets the state in which the interrupt cancelling unit 221 can output (transmit) a signal to the peripheral device 201 via the differential clock signal line CLK− 218.

1.1.2 Peripheral Device

As shown in FIG. 2, the peripheral device 201 includes a target 204 and a communication interface (I/F) 206.

The target 204 achieves functions required by the processing performed by the peripheral device 201. When, for example, the peripheral device 201 is the wireless device 104 shown in FIG. 1, the target 204 may include a CPU, a network module, and an IO module, and controls transmission and reception of commands and data to and from the remote device to which the target 204 is connected wirelessly. The target 204 provides (transmits) an interrupt signal to the host device 200 using the communication I/F 206 as controlled by the remote device.

The communication I/F 206 enables communication, such as data transmission or reception, with the host device 200. The communication I/F 206 includes a transaction control unit 208, a link control unit 210, a PHY unit 212, and a clock-input and interrupt-output control unit 217.

The transaction control unit 208 includes a control register or a transmission and reception buffer for temporarily storing data to control communication with the target 204 (to control the transaction layer). The transaction control unit 208 generates packets in accordance with the settings of the control register or with the state of the transmission and reception buffer. More specifically, the packets generated by the transaction control unit 208 include (1) a command packet that serves as a trigger for communication, (2) a response packet carrying a response, and (3) a data packet for transmitting and receiving data.

The link control unit 210 has the same function as the link control unit 209 included in the host device 200, and analyzes various packets to be transmitted, determines whether a transfer error has occurred in the transmission, and also controls the communication direction of the communication paths or the bit synchronization, or in other words controls the data link layer.

The PHY unit 212 includes a differential receiver, a decoding unit, and a serial/parallel conversion unit. The differential receiver transmits and receives serial data using the line DAT1. The decoding unit decodes serial data that has been encoded through, for example, 8b/10b encoding. The serial/parallel conversion unit converts the serial data input from the differential receiver to generate parallel encoded data. In addition to these components, the PHY unit 212 includes a differential clock reception unit 222, an interrupt output unit 223, and an interrupt stop unit 224.

The differential clock reception unit 222 receives a reference clock signal that is transmitted in synchronization with data transmitted or received using the serial communication network 202 (for example, a reference clock signal having a clock frequency of 45 to 150 MHz) from the differential clock signal lines including the lines CLK+ 215 and CLK− 218.

The interrupt output unit 223 outputs an interrupt signal to be transmitted to the host device 200 onto one of the two differential signal lines, or specifically, for example, the line CLK+ 215, which serves as the first signal line.

The interrupt stop unit 224 receives an interrupt cancelling signal transmitted from the host device 200 through, for example, the other one of the signal lines, or specifically, for example, the line CLK− 218, which serves as the second signal line. When the interrupt stop unit 224 receives the interrupt cancelling signal, the interrupt output unit 223 stops outputting the interrupt signal.

When (1) no reference clock signal is input from the host device 200 to the peripheral device 201 via the differential clock signal lines and (2) no interrupt cancelling signal is input from the host device 200 to the peripheral device 201 via the second signal line CLK− 218, the clock-input and interrupt-output control unit 217 controls the interrupt output unit 223 to generate and output an interrupt request signal in accordance with an instruction provided from the target 204. When the interrupt stop unit 224 detects that an interrupt cancelling signal is transmitted from the host device 200 to the peripheral device 201 via the second signal line CLK− 218, the clock-input and interrupt-output control unit 217 controls the interrupt output unit 223 to stop outputting the interrupt signal onto the first signal line CLK+ 215. Subsequently, the clock-input and interrupt-output control unit 217 connects the differential clock signal lines including the first signal line and the second signal line to the differential clock reception unit 222. In other words, the clock-input and interrupt-output control unit 217 sets the state in which the differential clock reception unit 222 can receive a clock signal via the differential clock signal lines including the first signal line and the second signal line.

Although the line CLK+ 215 is the first signal line and the line CLK− 218 is the second signal line in this example, the first signal line may be the line CLK− 218 and the second signal line may be the line CLK+ 215 in this example as well as in other examples described in this specification.

When the differential clock signal lines are connected to the differential clock output unit 219 and the differential clock reception unit 222 (when a clock signal is provided), an electric signal with differential signaling is transmitted on the differential clock signal lines. When the differential clock signal lines are connected to the interrupt reception unit 220, the interrupt cancelling unit 221, the interrupt output unit 223, and the interrupt stop unit 224 (when the clock signal has been stopped), an electric signal with single-ended signaling is transmitted on the first signal line and the second signal line, which are the differential clock signal lines. The voltage amplitude of an electric signal with single-ended signaling is typically larger than the voltage amplitude of an electric signal with differential signaling. Thus, the voltage of a signal transmitted with single-ended signaling (signal voltage) may change more significantly than the voltage of a signal transmitted with differential signaling (signal voltage).

1.2 Operation of the Communication System

The operation of the communication system 1000 with the above-described structure will now be described.

1.2.1 The System Operation for an Interrupt Request in Normal State

FIGS. 3A to 3D are timing charts for a data transmission and reception process performed when an interrupt request is provided from the peripheral device 201 to the host device 200 while a reference clock signal output from the host device 200 is being transmitted on the differential clock lines.

Figure 3:
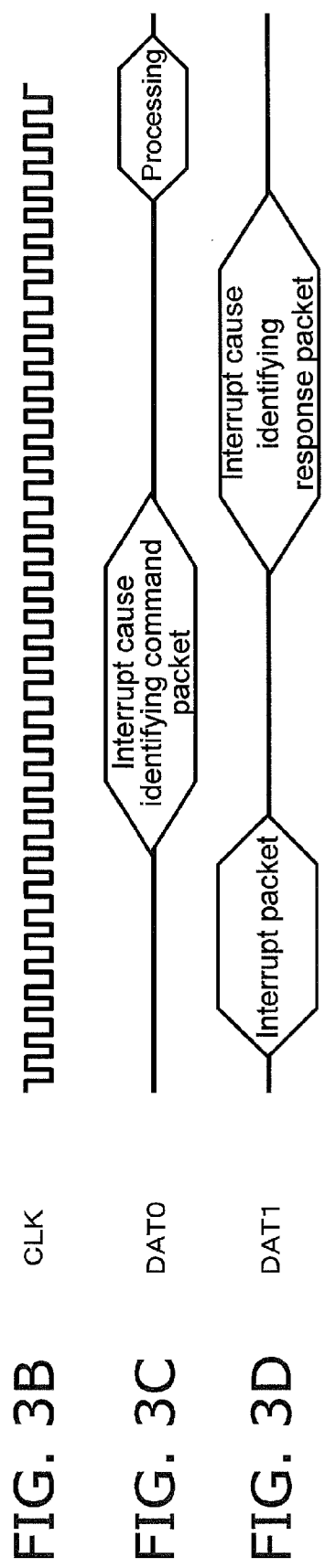
FIGS. 3A to 3D show transmission and reception of commands after a request for interrupt processing is transmitted and before the interrupt processing is performed while a reference clock signal is being output.

The differential clock output unit 219 generates a reference clock signal and outputs the reference clock signal (FIG. 3A).

The reference clock signal output from the differential clock output unit 219 is transmitted to the peripheral device though the differential clock signal lines (FIG. 3B).

In this state, the peripheral device 201 may transmit an interrupt request to the host device 200. More specifically, the peripheral device 201 may transmit an interrupt packet carrying an interrupt request to the host device 200 using the line DAT1 214 included in the serial communication network 202. In this case, the packet data to be transmitted is synchronized with the reference clock signal.

The host device 200 receives the interrupt packet transmitted from the peripheral device 201, and then transmits an interrupt cause identifying command packet to the peripheral device 201 using the line DAT0 213 included in the serial communication network 202. The interrupt cause identifying command packet carries an inquiry for information identifying the peripheral device that has generated and transmitted the interrupt request and information about the type of the interrupt.

The peripheral device 201 receives the interrupt cause carrying command packet from the host device 200, and then transmits an interrupt cause identifying response packet to the host device 200 using the line DAT1 214 included in the serial communication network 202. The interrupt cause identifying response packet carries information identifying the peripheral device that has generated and output the interrupt request and information identifying the type of the interrupt.

The host device 200 receives the interrupt cause identifying response packet, and then performs interrupt processing required by the interrupt request based on the information identifying the peripheral device that has generated and output the interrupt request and the information identifying the type of the interrupt.

1.2.2 An Interrupt Request Handling Process Performed when No Reference Clock Signal is Output Timing Sequence An interrupt request handing process performed when no reference clock signal is output will now be described.

Figure 4:
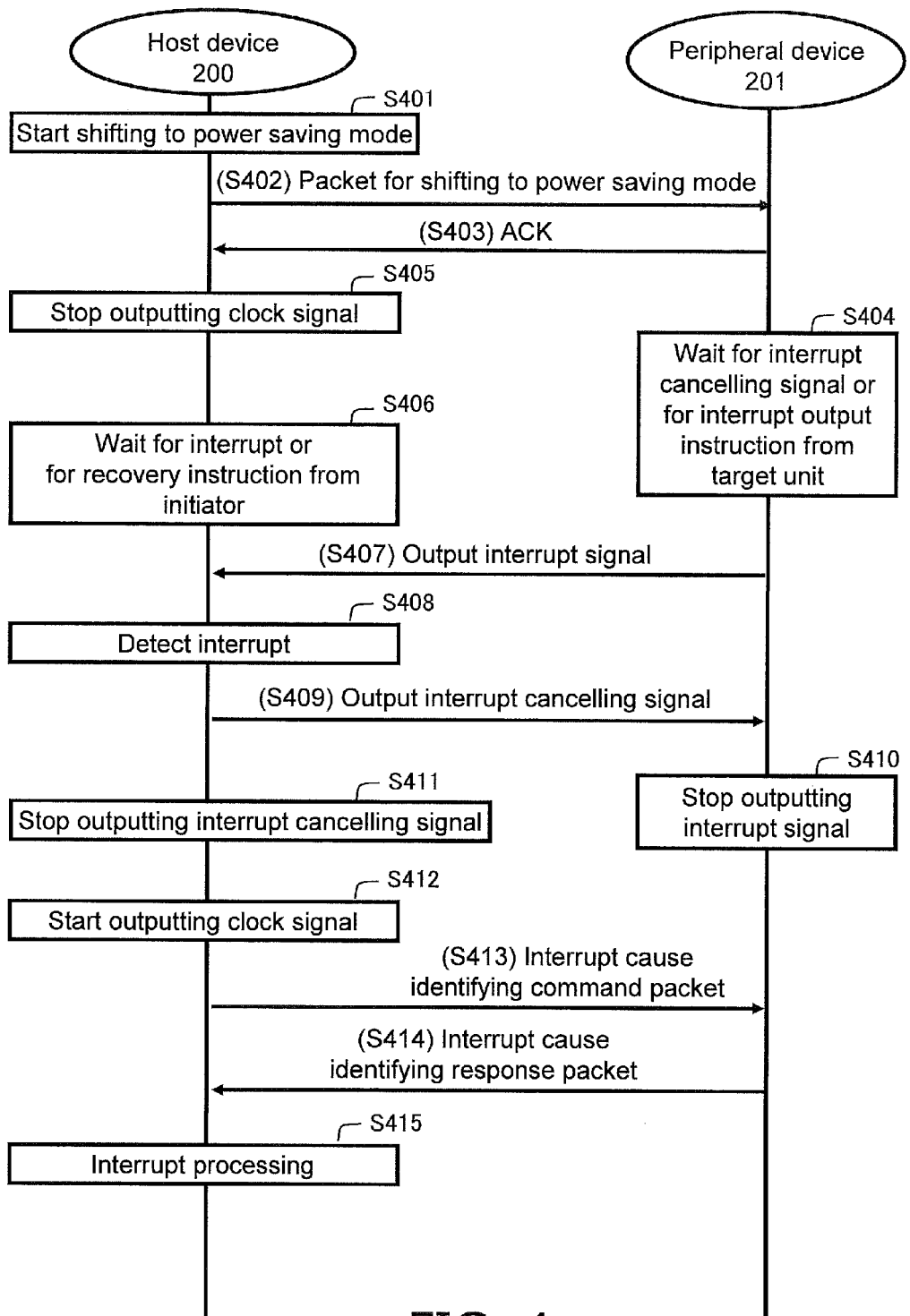
FIG. 4 is a flowchart showing an interrupt signal handling process performed after the system shifts to the power saving mode in the first embodiment.

FIG. 4 shows the interrupt request handling process performed when an interrupt request is transmitted while no reference clock signal is being output from the host device 200 onto the differential clock signal lines. In this case, (1) the first signal line CLK+ 215, which is one of the differential clock signal lines, is connected to the interrupt reception unit 220 included in the host device 200 and the interrupt output unit 223 included in the peripheral device 201, whereas (2) the second signal line CLK− 218 is connected to the interrupt cancelling unit 221 included in the host device 200 and the interrupt stop unit 224 included in the peripheral device 201.

The state in which no reference clock signal is being output refers to, for example, the state in which the output of the reference clock signal has been stopped to reduce power consumption. This state can specifically occur, for example, in the power saving operation mode of the host device 200 and/or the peripheral device 201. Although the power saving operation mode (power saving state) is used as an example of the state in which the reference clock signal output has been stopped in the present example, the present technique may also be applicable to other cases in which any state other than the power saving operation mode is used as the state in which no reference clock signal is being output.

Before the processing in step S401 is performed, a reference clock signal is being output from the host device 200. While the reference clock signal is being output from the host device 200, the host device 200 and the peripheral device 201 transmit and receive or can transmit and receive packets including a command packet, a data packet, and an interrupt packet.

Step S401:

When a predetermined condition is satisfied, the host device 200 starts shifting to the power saving mode. The predetermined condition may be, for example, the condition under which the host device 200 has no processing to be performed and also the peripheral device 201 has no interrupt to be generated.

Step S402:

The host device 200 transmits a command packet for shifting to the power saving mode to the peripheral device 201. This command packet may not necessarily be transmitted when the peripheral device 201 can automatically determine that no reference clock signal is being input. However, this command packet transmitted from the host device 200 to the peripheral device 201 increases the reliability of the control with which the peripheral device 201 shifts to the power saving mode.

Step S403:

The peripheral device 201 receives, from the host device 200, the command packet for causing the peripheral device to shift to the power saving mode, and then transmits a response packet (ACK) indicating the reception of the command packet to the host device 200.

Step S404:

The peripheral device 201 executes control for shifting to the power saving mode. More specifically, the clock-input and interrupt-output control unit 217 enables the interrupt stop unit 224 to receive an interrupt cancelling signal that is transmitted from the host device 200 (sets the state in which the interrupt stop unit 224 can receive an interrupt cancelling signal transmitted from the host device 200), and further enters a state in which it waits for an interrupt instruction provided from the target 204. The clock-input and interrupt-output control unit 217 connects the first signal line, which is one of the differential clock signal lines, to the interrupt output unit 223, and connects the second signal line, which is the other one of the differential clock signal lines, to the interrupt stop unit 224.

Step S405:

The host device 200 executes control for shifting to the power saving mode. More specifically, the clock-output and interrupt-reception control unit 216 controls the differential clock output unit 219 to stop outputting the reference clock signal, and enables the interrupt reception unit 220 to receive an interrupt signal (sets the state in which the interrupt reception unit 220 can receive an interrupt signal transmitted from the peripheral device 201). Also, the clock-output and interrupt-reception control unit 216 connects the first signal line, which is one of the differential clock signal lines, to the interrupt reception unit 220, and connects the second signal line, which is the other one of the differential clock signal lines, to the interrupt cancelling unit 221.

When the clock-output and interrupt-reception control unit 216 connects the differential clock signal lines to the interrupt reception unit 220 and the interrupt cancelling unit 221, the first signal line CLK+ 215 and the second signal line CLK− 218 are connected to resistances pulled up to, for example, the power supply voltage (pull-up resistances). This sets the signal level of the first signal line CLK+ 215 and the second signal line CLK− 218 to a high level. The above-described control is achieved as follows. That is, for example, when the functional units connected to the differential clock signals (for example the interrupt reception unit 220 and the interrupt cancelling unit 221) are enabled to transmit a signal to the differential clock signal lines, the output terminal of each of those functional units is set equivalent to an open collector output terminal. When those functional units are enabled to receive a signal input using the differential clock signal lines, the input terminal of each of those functional units is set equivalent to a terminal connected to an input buffer having a high input impedance (for example having an infinite input impedance) and to a resistance pulled up to, for example, the power supply voltage.

Step S406:

The host device 200 waits for an input of an interrupt request signal transmitted from the peripheral device 201, or waits for an input of an instruction to start processing in accordance with a user operation. The user operation includes an operation to cause the host device 200 to recover from the power saving mode to the normal operation mode.

Step S407:

As controlled by, for example, the remote device, the target 204 transmits an interrupt instruction to the clock-input and interrupt-output control unit 217. The clock-input and interrupt-output control unit 217 controls the interrupt output unit 223 to output an interrupt request signal via the first signal line. In response to the interrupt request signal, the first signal line CLK+ 215, which has been at a high level pulled up to, for example, the power supply voltage, is set to a low level. The first signal line is set to a low level by, for example, turning on a transistor connected to an open collector output terminal. As a result, the peripheral device 201 outputs an interrupt request signal to the host device 200.

Step S408:

The interrupt reception unit 220 detects the interrupt request signal input via the first signal line. More specifically, the interrupt reception unit 220 can detect the interrupt request signal by detecting a change in the potential level of the first signal line. In the present embodiment, the interrupt reception unit 220 detects the interrupt request signal by detecting a low-level potential on the signal line.

Step S409:

When the interrupt reception unit 220 detects the interrupt request signal, the clock-output and interrupt-reception control unit 216 controls the interrupt cancelling unit 221 to output an interrupt cancelling signal to the peripheral device 201 via the second signal line.

Step S410:

When the interrupt stop unit 224 receives the interrupt cancelling signal, the clock-input and interrupt-output control unit 217 executes control to stop the output of the interrupt signal. To stop the output of the interrupt signal, the clock-input and interrupt-output control unit 217 controls the interrupt output unit 223 to stop operating (stops the output of the interrupt signal from the interrupt output unit 223) or disables the interrupt output unit 223 (sets the output terminal of the interrupt output unit 223 to a high impedance state to electrically disconnect the output terminal from the first signal line CLK+ 215).

Step S411:

When detecting that the input of the interrupt request signal into the interrupt reception unit 220 has been stopped, the clock-output and interrupt-reception control unit 216 stops the output of the interrupt cancelling signal. To stop the output of the interrupt cancelling signal, the clock-output and interrupt-reception control unit 216 controls the interrupt cancelling unit 221 to stop operating, or disables the interrupt cancelling unit 221.

The clock-output and interrupt-reception control unit 216 detects that the signal level of the signal line CLK+ 215 has changed to a high level, and then stops the output of the interrupt cancelling signal on the signal line CLK− 218 (sets the signal line to a high impedance (Hi-Z) state) (see the timing chart of FIG. 5 described later).

Step S412:

The clock-output and interrupt-reception control unit 216 enables the differential clock output unit 219, and connects the differential clock signals, or specifically the first and second signal lines, to the differential clock output unit 219. As a result, the host device 200 starts outputting a reference clock signal.

In the timing chart of FIG. 5 (described later), the differential clock signal starts being output to the signal lines CLK+ 215 and CLK− 218 at timing t5.

Step S413:

The host device 200 transmits an interrupt cause identifying command packet to the peripheral device 201 in synchronization with the reference clock signal that has started being output. The interrupt cause identifying command packet carries an inquiry for information identifying the peripheral device 201 that has transmitted the interrupt request signal and information indicating the type of the interrupt.

Step S414:

The peripheral device 201 receives the interrupt cause identifying command packet, and then transmits an interrupt cause identifying response packet to the host device 200 in synchronization with the reference clock signal transmitted on the differential clock signal lines. The interrupt cause identifying response packet carries information identifying the peripheral device and information identifying the type of the interrupt.

Step S415:

The host device 200 receives the interrupt cause identifying response packet transmitted from the peripheral device 201, and then performs processing required by the interrupt generated by the peripheral device based on the information identifying the peripheral device and the information identifying the type of the interrupt included in the command. The processing may consist of a series of processing caused by commands transmitted from the host device 200 to the peripheral device 201 via the serial communication network 202.

The host device 200 can deactivate its power saving mode when no interrupt is transmitted from the peripheral device 201 simply by performing the processing in step S409, or outputting an interrupt cancelling signal, and performing subsequent processing. In this case, the clock-input and interrupt-output control unit 217 included in the peripheral device 201 is only required to advance its processing to step S410 and subsequent steps when the interrupt stop unit 224 determines that an interrupt cancelling signal has been input from the host device 200 to the peripheral device 201 continuously for at least a predetermined period of time. This prevents the output of the interrupt signal from the peripheral device 201 and the output of the reference clock signal from the host device 200 from colliding each other when the output timings of these signals coincide with each other. In this example, the host device 200 outputs the interrupt cancelling signal to the peripheral device 201 for a predetermined period of time before the host device 200 starts outputting the reference clock signal. This stops the interrupt signal output from the peripheral device 201 in a reliable manner.

Timing Chart

An interrupt request handling process performed when no reference clock signal is output will now be described with reference to the timing chart of in FIG. 5.

Figure 5:
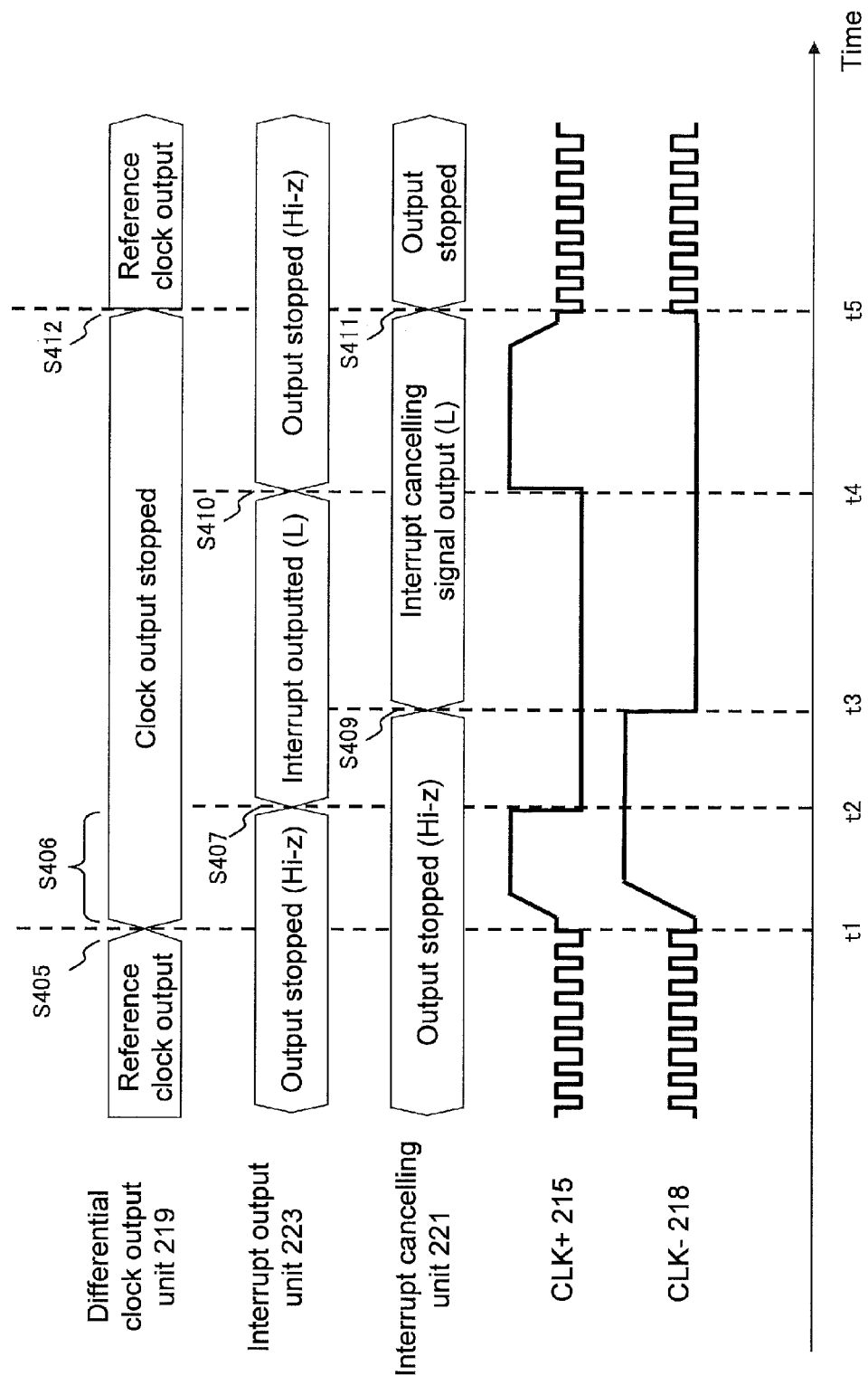
FIG. 5 shows the state of each signal line in the interrupt signal handling process performed after the system shifts to the power saving mode in the first embodiment.

FIG. 5 is a timing chart showing the state of each of the signal lines of the serial communication network 202 and the differential clock signal lines (CLK+ 215 and CLK− 218) corresponding to the processing of the timing sequence shown in FIG. 4.

Timing t1:

The host device 200 stops outputting the reference clock signal that has been output via the differential clock signal lines. More specifically, the differential clock output unit 219 stops generating and outputting the reference clock signal (step S405). The host device 200 stops generating and outputting the reference clock signal to reduce power consumption. When the host device 200 stops outputting the reference clock signal, the first and second signal lines are connected to, for example, the power supply voltage via the pull-up resistances. As a result, the signal level of the first signal line and the second signal line is pulled up to, for example, the power supply voltage, and is held in the high level voltage state (held at the high level potential), while the interrupt output unit 223 and the interrupt cancelling unit 221 are outputting no signal.

Timing t2:

The peripheral device 201 outputs an interrupt request signal onto the first signal line (step S407). The interrupt request signal is an output signal having a low-level voltage. The peripheral device 201 outputs the interrupt request signal by, for example, turning on the transistor connected to the open collector output terminal and setting the signal level of the first signal line CLK+ 215, which has been at a high level, to a low level.

Timing t3:

The host device 200 detects the interrupt request signal, and then transmits an interrupt cancelling signal to the peripheral device 201 via the second signal line (step S409). This interrupt cancelling signal is an output signal having a low level voltage set in the same manner as for the interrupt request signal.

When the reference clock signal is transmitted on the differential clock signal lines, each of the first signal line and the second signal line is driven using a differential voltage. In this case, the voltage fluctuations on those signal lines are small. However, when the interrupt request signal and the interrupt cancelling signal are transmitted on the first signal line and the second signal line, each of the signal lines is driven using single-ended signaling. In this case, the voltage fluctuations on those signal lines are relatively large.

Timing t4:

The peripheral device 201 detects the interrupt cancelling signal, and then stops outputting the interrupt request signal (step S410) (by, for example, turning off the transistor connected to the open collector output terminal and pulling up the signal level of the first signal line CLK+ 215 to, for example, the power supply voltage and setting the signal level of the first signal line to a high level). This changes the potential level of the first signal line again to a high level.

Timing t5:

The host device 200 stops outputting the interrupt cancelling signal (step S411). More specifically, the clock-output and interrupt-reception control unit 216 connects the differential clock signal lines to the differential clock output unit to resume the output of the reference clock signal.

As described above, the communication system 1000 of the present embodiment enables the peripheral device 201 to transmit an interrupt request to the host device 200 relatively promptly when the reference clock signal output from the host device 200, with which communication data is to be synchronized, has been stopped.

The reference clock signal output may be stopped in the power saving mode. In this case, the communication system 1000 satisfies the need for promptly transmitting an interrupt request from the peripheral device 201 to the host device 200 while also satisfying the need for power saving of the host device 200 and the peripheral device 201.

Although the line CLK+ 215 is the first signal line and the line CLK− 218 is the second signal line in the present embodiment, the present invention should not be limited to this structure. The line CLK− 218 may be the first signal line, and the line CLK+ 215 may be the second signal line.

Second Embodiment

A second embodiment will now be described.

A communication system according to the second embodiment includes a host device and a plurality of peripheral devices connected to the host device. In this communication system, a specific peripheral device may generate an interrupt during the power saving mode. When the interrupt occurs, the power saving mode needs to be deactivated. A method according to the second embodiment for deactivating the power saving mode of the host device and all the peripheral devices and causing these devices to recover their normal operation mode, identifying the specific peripheral device that has generated the interrupt, and handling the interrupt will now be described with reference to FIG. 6.

Figure 6:
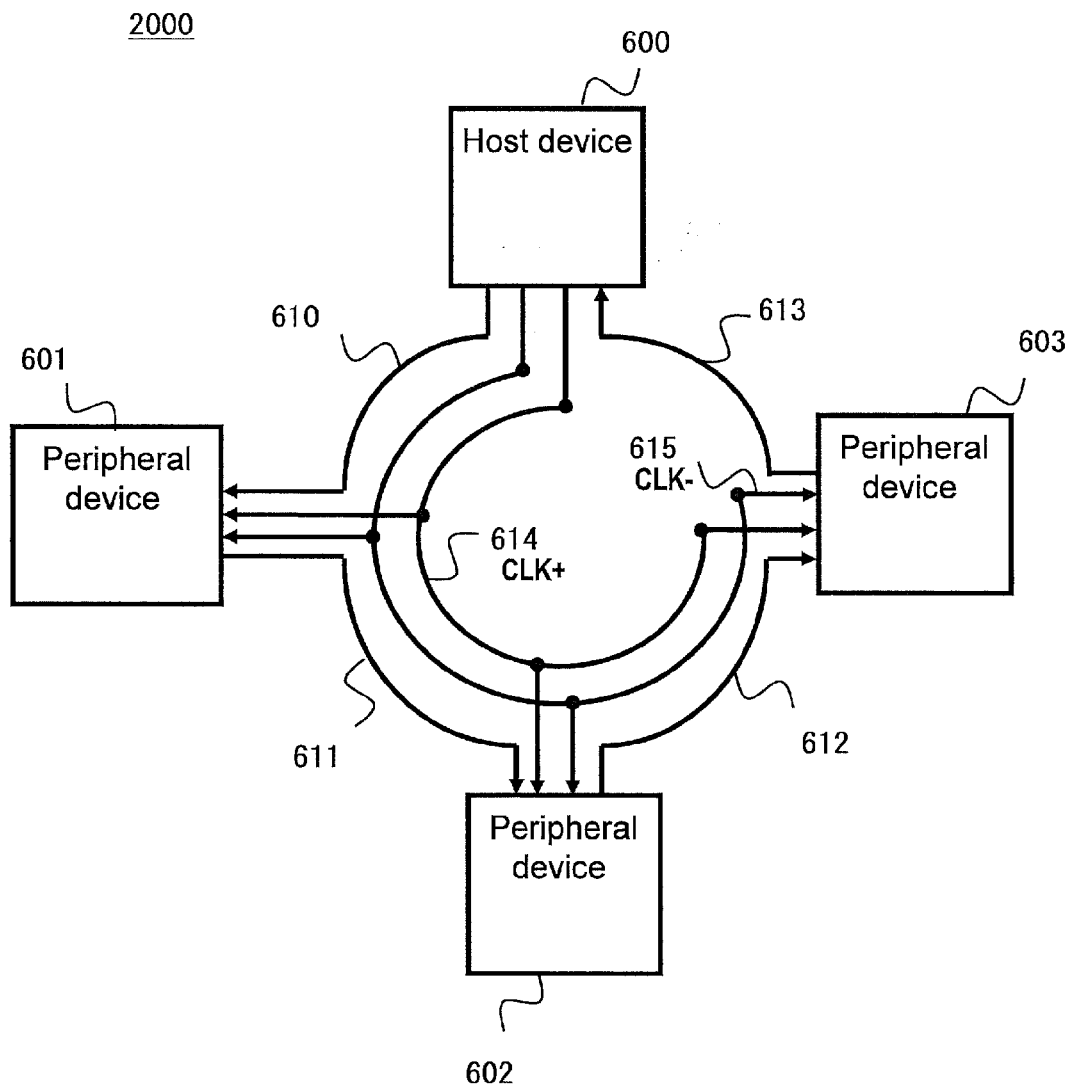
FIG. 6 shows a communication system having a ring topology according to a second embodiment.

FIG. 6 shows the overall structure of the communication system 2000 according to the present embodiment. As shown in FIG. 6, the communication system 2000 includes a host device 600 and peripheral devices 601, 602, and 603. The host device 600 and the peripheral devices 601 to 603 are connected in a ring using serial communication paths (610, 611, 612, and 613). In the present embodiment, the serial communication path 610 is used to transmit data from the host device 600 to the peripheral device 601, the serial communication path 611 is used to transmit data from the peripheral device 601 to the peripheral device 602, the serial communication path 612 is used to transmit data from the peripheral device 602 to the peripheral device 603, and the serial communication path 613 is used to transmit data from the peripheral device 603 to the host device 600.

This communication system includes reference clock signal lines used commonly to transmit a clock reference signal from the host device 600 to the peripheral devices 601, 602, and 603. In this system, all the peripheral devices 601, 602, and 603 are connected commonly to differential signal lines (CLK+ 614 (a first signal line) and CLK− 615 (a second signal line)), which are connected to the host device 600.

In the communication system 2000 of the present embodiment, each serial communication path is used to connect between two devices among the host device 600 and the peripheral devices 601, 602, and 603 as described above, whereas the differential signal lines (614 and 615) are used to commonly connect all the host device 600 and the peripheral devices 601, 602, and 603.

This connection topology enables the host device 600 to set the entire communication system 2000 to enter the power saving operation mode simply by stopping the reference clock signal generated and output on the differential signal lines.

The internal structure of the host device 600 is identical to the internal structure of the host device 200 according to the first embodiment. In the same manner, the internal structure of the peripheral devices 601, 602, and 603 is identical to the structure of the peripheral device 201 according to the first embodiment. In other words, the communication system of the second embodiment is identical to the communication system of the first embodiment in the structures of its host device and peripheral devices, but differs from the communication system of the first embodiment in its connection topology of the serial communication paths and the differential signal lines.

The communication method used in the present embodiment (with which the host device 600 transmits a command to the peripheral device 601 and the peripheral device 601 transmits a response to the host device 600) will now be described with reference to FIG. 6.

In the initialization process of communication performed when the host device 600 is booted, the reference clock signal starts being provided from the host device 600 to the peripheral devices 601, 602, and 603 via the differential clock signal lines (CLK+ 614 and CLK− 615). The reference clock signal has a predetermined frequency range (a frequency range of, for example, 45 to 150 MHz) in a normal state.

The host device 600 transmits a command packet. The peripheral device 601 receives the command through the serial communication path 610, and then determines whether the command packet is intended for the peripheral device 601. The command packet transmitted from the host device 600 contains an identifier (a device ID) of a destination peripheral device to which the command packet is to be transmitted. In the communication system 2000 of the present embodiment, the host device 600 and the peripheral devices 601, 602, and 603 each have an identifier (device ID) uniquely assigned to each device. The peripheral device 601 that has received the packet compares its assigned device ID with the device ID contained in the received command packet, and determines whether the received packet is intended for the peripheral device 601.

When determining that the received packet is not intended for the peripheral device 601, the device 601 transmits the received command packet to the peripheral device 602, which is subsequent to the peripheral device 601, using the serial communication path 611. When determining that the received packet is intended for the peripheral device 601, the device 601 generates a response packet as required by the received command packet, and transmits the generated response packet to the subsequent peripheral device 602 using the serial communication path 611. The peripheral device 601 sets its unique device ID in the response packet to be transmitted. In this case, the peripheral device 601 sets the device ID in the response packet to be transmitted as the device ID of the host device 600. In the present embodiment, the peripheral device 601 generates a response packet as required by the received command packet, and transmits the response packet containing the device ID of the host device 600 using the serial communication path 611.

The peripheral device 602 determines whether the packet received from the peripheral device 601 is intended for the peripheral device 602 based on the device ID contained in the received packet. In this example, the packet received by the peripheral device 602 is the response packet to be transmitted from the peripheral device 601 to the host device 600. In this case, the peripheral device 602 determines that the received packet is not intended for the peripheral device 602. The peripheral device 602 then transmits the received response packet to the peripheral device 603 via the serial communication path 612.

The peripheral device 603 also performs the same determination and the same processing as performed by the peripheral device 602. The peripheral device 603 then transmits the received response packet to the host device 600 via the serial communication path 613.

The host device 600 receives the packet from the peripheral device 601 via the serial communication path 613, and determines that the packet is intended for the host device 600 based on the device ID contained in the packet.

In the manner described above, the host device 600 finally receives the response packet generated in response to the transmitted command packet. This completes the processing (session) involving transmission and reception of packets between the host device 600 and the peripheral devices 601, 602, and 603.

In the communication system 2000 of the present embodiment, as described above, a packet received by one peripheral device on one serial communication path is transmitted to another peripheral device subsequent to the peripheral device receiving the packet via another serial communication path when the device ID contained in the received packet differs from the device ID of the device receiving the packet. In this case, the peripheral device receiving the packet can be logically assumed to function as a serial communication path via which the packet on one serial communication packet is to be transmitted to another serial communication path. This assumption enables the communication system 2000 of the present embodiment to use the same communication method as the method used in the communication system of the first embodiment having a point-to-point topology, in which the host device is connected to the single peripheral device.

In the present embodiment, each of the serial communication paths 610, 611, 612, and 613 is used to connect two devices among the host device 600 and the peripheral devices 601, 602, and 603, whereas the differential clock signal lines are used to commonly connect all the host device 600 and the peripheral deices 601, 602, and 603. In the communication system 2000, the peripheral devices 601, 602, and 603 can output an interrupt signal to the host device 600 using the first signal line, which is one of the differential clock signal lines, even when the host device 600 has shifted to, for example, the power saving operation mode and the reference clock signal output is stopped. Also, the host device 600 can output an interrupt cancelling signal to the peripheral devices 601, 602, and 603 using the second signal line.

In the communication system 2000, the signal lines CLK+ 614 (the first signal line) may be pulled up to, for example, the power supply voltage, and the output terminal of each peripheral device may be formed as a three-state terminal or an open collector terminal. When no interrupt occurs, the output terminal of each peripheral device is set to a high impedance state. When an interrupt occurs, the output terminal of each peripheral device is set to a low level voltage. When two or more peripheral devices each output an interrupt signal at the same time, the first signal line maintains the low voltage level while at least one of the plurality of peripheral devices is outputting an interrupt signal. In other words, the first signal line indicates the logical OR of the interrupt signals output from the plurality of peripheral devices.

When two or more peripheral devices each output an interrupt signal, the host device 600 can identify each peripheral device outputting an interrupt signal. The host device 600 identifies these devices by, for example, transmitting an interrupt cause identifying command packet by the number of times corresponding in one-to-one to all the peripheral devices connected in the communication system 2000, or by transmitting an interrupt cause identifying command packet repeatedly until the output of each interrupt signal is stopped.

Alternatively, the host device 600 can also identify the peripheral devices that each have generated (output) an interrupt signal by transmitting a single interrupt cause identifying command packet requiring each of all the peripheral devices connected in the system to transmit a response to the command packet. The communication system 2000 may employ the above-described method to identify the plurality of peripheral devices that each have output an interrupt request by transmitting a single packet.

As described above, the communication system in which the host device and the plurality of peripheral devices are connected in a ring enables the peripheral devices to transmit an interrupt request to the host device promptly when the reference clock signal output on the differential clock signal lines has been stopped.

The reference clock signal output may be stopped in the power saving mode. In this case, the communication system 2000 satisfies the need for promptly transmitting an interrupt request while also satisfying the need for power saving.

The ring topology of the communication system enables the host device to communicate with the plurality of peripheral devices, or to transmit and receive data to and from the plurality of peripheral devices or receive an interrupt signal from the plurality of peripheral devices without increasing the number of connection terminals used to connect the host device and the plurality of peripheral devices.

Third Embodiment

A third embodiment of the present embodiment will now be described.

A communication system in which a host device and a plurality of peripheral devices are connected using a hub device will now be described with reference to FIG. 7.

Figure 7:
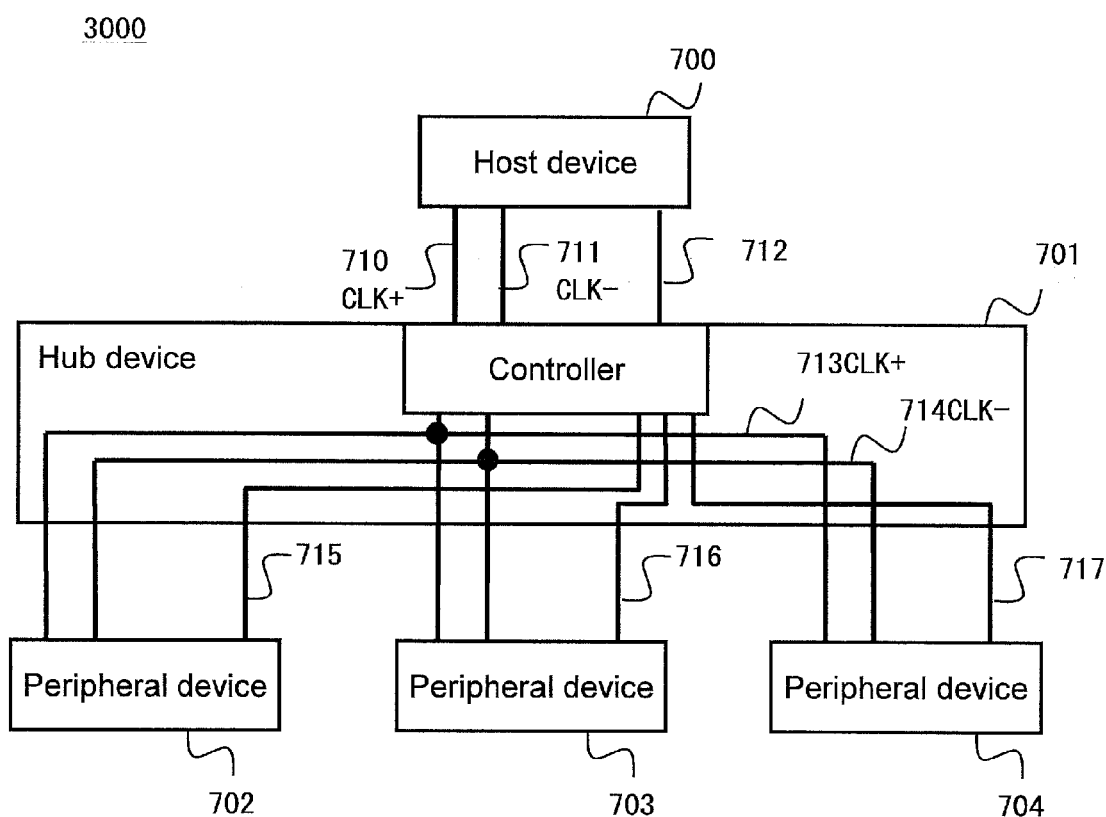
FIG. 7 shows a communication system having a hub topology according to a third embodiment.

FIG. 7 shows the overall structure of the communication system 3000 according to the present embodiment. The communication system includes a host device 700, a hub device 701, and peripheral devices 702, 703, and 704. The host device 700 is connected to the hub device 701 using differential clock signal lines including two signal lines CLK+ 710 (a first signal line) and CLK− 711 (a second signal line) and a serial communication network 712. The hub device 701 is connected to the peripheral devices 702, 703, and 704 using differential clock signal lines including two differential clock lines CLK+ 713 (a first signal line) and CLK− 714 (a second signal line) and serial communication networks 715, 716, and 717. The hub device 701 and the peripheral devices 702, 703, and 704 are connected with the signal line CLK+ 713 using a wired OR connection. In the same manner, the hub device 701 and the peripheral devices 702, 703, and 704 are connected with signal line CLK− 714 using a wired OR connection.

The internal structures of the host device 700 and the peripheral devices 702, 703, and 704 are identical to the internal structures of the host device and the peripheral devices of the above embodiments.

A procedure with which the host device 700 transmits a command packet to the peripheral device 702 and receives a response packet generated in response to the command packet will now be described.

In the initialization process of communication performed when the host device 700 is booted, the reference clock signal starts being provided from the host device 700 to the hub device 701 via the differential clock signal lines (CLK+ 710 and CLK− 711). The hub device 701 receives the reference clock signal from the host device 700, and starts providing the reference clock signal to the peripheral devices 702, 703, and 704 via the differential clock signal lines (CLK+ 713 and CLK− 714).

The host device 700 transmits a command packet intended for the peripheral device 702 to the hub device 701 via the serial communication network 712. The hub device 701 receives the command packet, and then determines the destination device to which the packet is to be transmitted based on a device ID contained in the received packet. In this example, the hub device 701 determines that the destination device to which the packet is to be transmitted is the peripheral device 702, and then transmits the command packet received via the serial communication network 715 to the peripheral device 702. In the same manner as described in the second embodiment, the hub device 701 compares an identifier (a device ID) of the transmission destination device contained in the command packet with an identifier (a device ID) assigned to each of the devices connected in the communication system, and determines and identifies the destination device to which the packet is to be transmitted.

The peripheral device 702 receives the command packet from the hub device 701. The peripheral device 702 analyzes the command carried by the received command packet, and generates a response packet carrying a response to the command. The peripheral device 702 transmits the generated response packet to the hub device 701 via the serial communication network 715. The peripheral device 702 sets the device ID of the host device in the response packet.

The hub device 701 determines the destination device to which the response packet is to be transmitted based on the device ID contained in the response packet received from the peripheral device 702. The response packet contains the device ID of the host device 700. In this case, the hub device 701 determines that the transmission destination is the host device 700. The hub device 701 transmits the response packet to the host device 700 via the serial communication network 712.

The host device 700 receives the response packet from the hub device 701. In the manner described above, the host device 700 completes the processing (session) involving transmission of a command packet and reception of a response packet generated in response to the command packet to and from the peripheral device 702.

As described above, the hub device 701 in the present embodiment identifies a device ID contained in a packet received from the host device 700 or from each of the peripheral devices 702, 703, and 704, and transmits the received packet to the device that has been identified as the transmission destination. This relay function of the hub device 701 enables the host device 700 and the peripheral devices 702, 703, and 704 to communicate logically using the same sequence as used in the communication system having the point-to-point topology described in the first embodiment.

A method with which the peripheral devices 702, 703, and 704 output an interrupt signal when the host device 700 has shifted the operation mode of the communication system 3000 to, for example, the power saving operation mode and the reference clock signal output from the host device 700 has been stopped will now be described.

The host device 700 transmits a packet for changing the operation mode to the power saving mode in the same manner as described in the above embodiments. This causes all the peripheral devices connected to the hub device 701 to shift to the power saving mode. Subsequently, the host device 700 stops outputting the reference clock signal. As a result, the hub device 701 also stops outputting the reference clock signal. In this case, the clock-output and interrupt-reception control unit included in the host device 700 connects the first signal line to the interrupt reception unit 220 and the second signal line to the interrupt cancelling unit 221 in the same manner as in the first embodiment. The clock-input and interrupt-output control unit included in the peripheral devices 702, 703, and 704 also connect the first signal line to the interrupt output unit 223 and the second signal line to the interrupt stop unit 224 in the same manner as in the first embodiment.

The interrupt output unit 223 included in the peripheral device 702 outputs an interrupt signal to the signal line CLK+ 713 (the first signal line) to transmit a request for interrupt processing to the host device 700. The hub device 701 receives the interrupt signal input using the signal line CLK+ 713 (the first signal line). The hub device 701 outputs the interrupt signal to the signal line CLK+ 710 (the first signal line) connecting the hub device 701 and the host device 700. The interrupt reception unit 220 included in the host device 700 receives the interrupt signal output from the hub device 701. As a result, the host device 700 receives the interrupt signal transmitted from the peripheral device 702 via the hub device 701.

The host device 700 that has detected the interrupt signal transmitted from the peripheral device 702 outputs an interrupt cancelling signal from the interrupt cancelling unit 221. The interrupt cancelling signal is transmitted to the hub device 701 using the signal line CLK− 711 (the second signal line).

The hub device 701 outputs, using the signal line CLK− 714 (the second signal line), the interrupt cancelling signal input using the signal line CLK− 711 to all the peripheral devices 702, 703, and 704 connected to the signal line CLK− 714 (the second signal line).

When the interrupt stop unit 224 included in the peripheral device 702 receives the interrupt cancelling signal from the hub device 701, the clock-input and interrupt-output control unit 217 included in the peripheral device 702 stops the output of the interrupt signal by disabling the interrupt output unit 223 included in the peripheral device 702.

The hub device 701 detects that the output of the interrupt signal from the peripheral device 702 on the signal line CLK+ 713 (the first signal line) has been stopped. The hub device 701 notifies, via the signal line CLK+ 710, the host device 700 that the interrupt signal has been cancelled. The notification is performed by changing the signal voltage of the signal line CLK+ 710 from a low level to a high level as described with reference to FIG. 5. The host device 700 detects the change in the signal level.

The interrupt reception unit 220 included in the host device 700 detects that the output of the interrupt signal from the peripheral device 702 has been stopped. The clock-output and interrupt-reception control unit 216 then stops the output of the interrupt cancelling signal by disabling the interrupt cancelling unit 221. Subsequently, the clock-output and interrupt-reception control unit 216 included in the host device 700 enables the differential clock output unit 219 to connect the differential clock signal lines to the differential clock output unit 219. As a result, the host device 700 starts outputting the reference clock signal.

The hub device 701 then starts outputting the reference clock signal to the peripheral devices 702, 703, and 704 via the differential clock signal lines (the signal lines CLK+ 713 and the signal line CLK− 714) in accordance with the input of the reference clock signal from the host device 700.

With the above procedure, the communication system 3000 provides a reference clock signal necessary in transmission and reception of packets. This enables the host device 700 to transmit and receive packets to and from the hub device 701 and the peripheral devices 702, 703, and 704 via the serial communication networks 712, 715, 716, and 717. The host device 700 transmits an interrupt cause identifying command packet to the peripheral devices 702, 703, and 704 via the hub device 701. The peripheral device 702 receives the interrupt cause identifying command packet via the hub device 701. The peripheral device 702 generates an interrupt cause identifying response packet in response to the interrupt cause identifying command packet, and transmits the generated interrupt cause identifying response packet to the host device 700 via the hub device 701.

The host device 700 receives the interrupt cause identifying response packet, and identifies the device that has generated the interrupt and the type of the interrupt contained in the packet. Based on the identification information, the host device 700 performs processing required by the device that has generated the interrupt request.

As described above, the communication system 3000 of the present embodiment enables an interrupt request transmitted from a peripheral device to be received when no reference signal is output from the host device 700, and enables processing required by the device that has generated the interrupt request to be performed promptly.

Although the present embodiment describes the case in which the peripheral device 702 outputs an interrupt signal, the peripheral device 703 or the peripheral device 704 may output an interrupt signal. The recovery from the power saving mode to the normal operation mode described above is performed with the same procedure as described above.

With the same method as described in the second embodiment, the signal line CLK+ 713 (first signal line) can indicate the logical OR of the interrupt signals output from the plurality of peripheral devices. Also, the host device 700 can identify which peripheral device among the plurality of peripheral devices 702, 703, and 704 has generated an interrupt with the same method as described in the second embodiment.

As described above, the communication system 3000 of the present embodiment in which the host device 700 and the peripheral devices 702, 703, and 704 are connected via the hub device 701 enables an interrupt request to be handled promptly when the output of the reference clock signal from the host device 700 has been stopped.

The reference clock signal output may be stopped in the power saving operation mode of the communication system 3000. In this case, the communication system 3000 satisfies the need for promptly transmitting an interrupt request while also satisfying the need for power saving.

The host device 700 is connected to the peripheral devices via the hub device 701. This structure eliminates the need for connecting the host device 700 to each of the plurality of peripheral devices, and prevents the number of connection terminals of the host device 700 from increasing.

Other Embodiments

Although the present invention has been described based on the first, second, and third embodiments, the present invention should not be limited to these embodiments. The above embodiments may be modified freely without departing from the scope and the spirit of the invention. The numerical values specified in the above embodiments are mere examples, and other numerical values may be used instead.

Although the above embodiments describe the case in which the clock-output and interrupt-reception control unit 216, the interrupt reception unit 220, and the interrupt cancelling unit 221 are functional units included in the communication I/F 205, the present invention should not be limited to this structure. For example, these units may be functional modules combined with some or all of the transaction control unit 207, the PHY 211, the link control unit 209, and the initiator 203. Further, those functional modules may be integrated in a large scale integration (LSI) circuit.

Although the above embodiments describe the case in which the clock-input and interrupt-output control unit 217, the interrupt output unit 223, and the interrupt stop unit 224 are functional units included in the communication I/F 206, the present invention should not be limited to this structure. For example, these units may be functional modules combined with some or all of the transaction control unit 208, the PHY 212, the link control unit 210, and the target 204. Further, those functional modules may be integrated in an LSI circuit.

Each block of the communication system, the host device, and the peripheral device described in the above embodiments may be formed using a single chip with a semiconductor device, such as LSI, or some or all of the blocks of the communication system, the host device, and the peripheral device may be formed using a single chip.

Although LSI is used as the semiconductor device technology, the technology may be an IC (integrated circuit), a system LSI, a super LSI, or an ultra LSI depending on the degree of integration of the circuit.

The circuit integration technology employed should not be limited to LSI, but the circuit integration may be achieved using a dedicated circuit or a general-purpose processor. A field programmable gate array (FPGA), which is an LSI circuit programmable after manufactured, or a reconfigurable processor, which is an LSI circuit in which internal circuit cells are reconfigurable or more specifically the internal circuit cells can be reconnected or reset, may be used.

Further, if any circuit integration technology that can replace LSI emerges as an advancement of the semiconductor technology or as a derivative of the semiconductor technology, the technology may be used to integrate the functional blocks. Biotechnology is potentially applicable.

All or part of the processes performed by the functional blocks described in the above embodiments may be implemented using programs. All or part of the processes performed by the functional blocks described in the above embodiments is implemented by a central processing unit (CPU) included in a computer. The programs for those processes are stored in a memory device such as a hard disk or a ROM, and are read into a ROM or a RAM and implemented.

The processes described in the above embodiments may be implemented using either hardware or software (which may be combined together with operating system (OS), middleware, or predetermined library), or may be implemented using both software and hardware. When each of the communication system, the host device, and the peripheral device of the above embodiments is implemented by hardware, the communication system, the host device, and the peripheral device require timing adjustment for their processes. For ease of explanation, the timing adjustment associated with various signals required in an actual hardware design is not described in detail in the above embodiments.

The processes described in the above embodiments may not be performed in the order specified in the above embodiments. The order in which the processes are performed may be changed without departing from the scope and the spirit of the invention.

The present invention may also include a computer program enabling a computer to implement the method described in the above embodiments and a computer readable recording medium on which such a program is recorded. The computer readable recording medium may be, for example, a flexible disk, a hard disk, a CD-ROM, an MO, a DVD, a DVD-ROM, a DVD-RAM, a Blu-ray disc, or a semiconductor memory.

The computer program should not be limited to a program recorded on the recording medium, but may be a program transmitted with an electric communication line, a radio or cable communication line, or a network such as the Internet.

In the above embodiments, the host device and the peripheral device are separate devices. However, the present invention should not be limited to this structure. The host device and the peripheral device may be incorporated in a single device. The host device may be an access module (host module), and the peripheral device may be a peripheral device module.

The specific structures described in the above embodiments are mere examples of the present invention, and may be changed and modified variously without departing from the scope and the spirit of the invention.

The host device of the present invention, the peripheral device of the present invention, and the communication system of the present invention including the host device and the peripheral device enable an interrupt signal to be transmitted and received between the host device and the peripheral device in an efficient manner. The present invention is applicable to a host device, a peripheral device, and a communication system including a host device and a peripheral device. The application examples of the present invention include an audiovisual device, a portable telephone, a smart phone, a peripheral device for a personal computer, and a semiconductor module. The present invention is therefore implementable in the field of communication system related technology.

APPENDIXES

The present technique may also be expressed in the following forms.

A first aspect of the present technique provides a host device that transmits, using differential signal lines including a first signal line and a second signal line, a reference clock signal to be used in transmission and reception of data to and from a peripheral device. The host device includes a differential clock output unit, an interrupt reception unit, and a clock-output and interrupt-reception control unit.

The differential clock output unit generates a reference clock signal and outputs the generated reference clock signal onto the differential signal lines.

The interrupt reception unit detects an interrupt signal output from the peripheral device onto the first signal line when an output of the reference clock signal onto the differential signal lines has been stopped.

The clock-output and interrupt-reception control unit starts transmitting, using the differential signal lines, a reference clock signal generated by the differential clock output unit when the interrupt signal becomes undetectable by the interrupt reception unit.

In this host device, the interrupt reception unit can detect an interrupt signal output from the peripheral device onto the first signal line when the output of the reference clock signal on the differential signal lines has been stopped. This enables the host device to receive a request for interrupt processing transmitted from the peripheral device promptly and reliably when no clock signal is output from the host device. This enables the interrupt processing to be performed in an appropriate manner when no clock signal is output from the host device.

A second aspect of the present technique provides a host device that transmits, using differential signal lines including a first signal line and a second signal line, a reference clock signal to be used in transmission and reception of data to and from a peripheral device. The host device includes a differential clock output unit, an interrupt reception unit, an interrupt cancelling unit, and a clock-output and interrupt-reception control unit.

The differential clock output unit generates a reference clock signal and outputs the generated reference clock signal onto the differential signal lines.

The interrupt reception unit detects an interrupt signal output from the peripheral device onto the first signal line when an output of the reference clock signal onto the differential signal lines has been stopped.

The interrupt cancelling unit outputs an interrupt cancelling signal onto the second signal line when the interrupt reception unit receives an interrupt from the peripheral device.

The clock-output and interrupt-reception control unit enables the interrupt reception unit to receive a signal input using the first signal line and enables the interrupt cancelling unit to output a signal onto the second signal line when an output of the reference clock signal onto the differential signal lines has been stopped, and controls the differential clock output unit to output a reference clock signal generated by the differential clock output unit onto the differential signal lines when the output of the interrupt signal from the peripheral device is stopped in response to the interrupt cancelling signal output from the interrupt cancelling unit.

In this host device, the interrupt reception unit can detect an interrupt signal output from the peripheral device onto the first signal line when the output of the reference clock signal onto the differential signal lines has been stopped. This enables the host device to receive a request for interrupt processing transmitted from the peripheral device promptly and reliably when no clock signal is output from the host device.

In this host device, the clock-output and interrupt-reception control unit controls the interrupt reception unit to enter a state in which a signal can be input using the first signal line to the interrupt reception unit and controls the interrupt cancelling unit to enter a state in which a signal can be output from the interrupt cancelling unit to the second signal line when no reference clock signal is output onto the differential signal lines. This host device can transmit and receive a signal (data) necessary in interrupt processing using the differential signal lines. As a result, the host device eliminates the need for adding transmission paths and connection terminals for the interrupt processing.

Also, in this host device, the clock-output and interrupt-reception control unit controls the differential clock output unit to output a reference clock signal generated by the differential clock output unit using the differential signal lines when the output of the interrupt signal from the peripheral device is stopped in response to the interrupt cancelling signal output from the interrupt cancelling unit. This prevents the interrupt signal and the clock signal from being output at the same timing and colliding each other to cause communication failures.

A third aspect of the present technique provides the host device of the second aspect of the present technique in which the clock-output and interrupt-reception control unit transmits a command inquiring a cause of an interrupt to the peripheral device using a data signal line for transmitting and receiving data in synchronization with the reference clock signal when the clock-output and interrupt-reception control unit controls the differential clock output unit to start outputting the reference clock signal and enables the host device to communicate with the peripheral device.

This structure enables the host device to transmit an inquiry about the cause of the interrupt to the peripheral device.

A fourth aspect of the present technique provides the host device of the second aspect of the present technique in which the clock-output and interrupt-reception control unit controls the differential clock output unit to output a reference clock signal generated by the differential clock output unit onto the differential signal lines after the interrupt cancelling unit outputs an interrupt cancelling signal onto the second signal line for a predetermined period of time when an output of the reference clock signal onto the differential signal lines has been stopped and no interrupt signal is detected by the interrupt reception unit.

This host device starts providing a reference clock signal to the peripheral device after transmitting the interrupt cancelling signal to the peripheral device for the predetermined period of time. This enables the peripheral device to be notified of the resumption of the reference clock signal in a reliable manner, and prevents the interrupt signal and the clock signal from being output onto the differential signal lines at the same time and colliding each other to cause communication failures.

A fifth aspect of the present technique provides the host device of the second aspect of the present technique in which the clock-output and interrupt-reception control unit controls the output of the reference clock signal to be stopped in a power saving operation of the host device, enables the interrupt reception unit to receive a signal input using the first signal line, and enables the interrupt cancelling unit to output a signal onto the second signal line.

This structure enables the interrupt processing to be performed in a reliable manner between the host device and the peripheral device when the host device is in the power saving operation. The use of the host device satisfies the need for performing interrupt processing in a reliable manner while also satisfying the need for power saving.

A sixth aspect of the present technique provides a peripheral device that receives, using differential signal lines including a first signal line and a second signal line, a reference clock signal to be used in transmission and reception of data to and from a host device. The peripheral device includes a differential clock reception unit, an interrupt generation unit, an interrupt stop unit, and a clock-input and interrupt-output control unit.

The differential clock reception unit receives the reference clock signal.

The interrupt generation unit generates an interrupt signal carrying an interrupt request to be transmitted to the host device using the first signal line when the reference clock signal input using the differential signal lines becomes undetectable.

The interrupt stop unit detects an interrupt cancelling signal transmitted from the host device using the second signal line.

The clock-input and interrupt-output control unit enables the interrupt generation unit to output a signal onto the first signal line and enables the interrupt stop unit to receive a signal input using the second signal line when an input of the reference clock signal using the differential signal lines is stopped, and enables the differential clock reception unit to receive a signal input using the differential signal lines when the interrupt generation unit stops outputting the interrupt signal in response to the interrupt cancelling signal transmitted from the host device.

This peripheral device generates an interrupt signal carrying an interrupt request to be transmitted to the host device using the first signal line when the reference clock signal input using the differential signal lines becomes undetectable. This enables the interrupt request to be promptly and reliably transmitted to the host device when no clock signal is provided from the host device.

In this peripheral device, the clock-input and interrupt-output control unit enables the interrupt generation unit to output a signal onto the first signal line and enables the interrupt stop unit to receive a signal input using the second signal line when the input of the reference clock signal using the differential signal lines is stopped. This peripheral device can transmit and receive a signal (data) necessary in the interrupt processing using the differential signal lines. As a result, the peripheral device eliminates the need for adding transmission paths and connection terminals for the interrupt processing.

In this peripheral device, the clock-input and interrupt-output control unit enables the differential clock reception unit to receive a signal input using the differential signal lines when the output of the interrupt signal is stopped in response to the interrupt cancelling signal transmitted from the host device. This prevents the interrupt signal and the clock signal from being output at the same timing and colliding each other to cause communication failures.

A seventh aspect of the present technique provides the peripheral device of the sixth aspect of the present technique in which the peripheral device receives a command inquiring a cause of an interrupt transmitted from the host device after the clock-input and interrupt-output control unit enables the differential clock reception unit to receive a reference clock signal, and transmits a response containing information identifying the cause of the interrupt generated in accordance with the command to the host device using a data signal line for transmitting and receiving data in synchronization with the reference clock signal.

An eighth aspect of the present technique provides the peripheral device of the sixth aspect of the present technique in which when an input of the reference clock signal has been stopped and the interrupt stop unit detects an interrupt cancelling signal transmitted from the host device, the clock-input and interrupt-output control unit enables the differential clock reception unit to receive a reference clock signal using the differential signal lines within a predetermined period of time from when the interrupt cancelling signal is detected.

This peripheral device is enabled to receive a reference clock signal after receiving the interrupt cancelling signal from the host device for the predetermined period of time. This enables the peripheral device to receive a reference clock signal from the host device in a reliable manner, and prevents the interrupt signal and the clock signal from being output onto the differential signal lines at the same time and colliding each other to cause communication failures.

A ninth aspect of the present technique provides the peripheral device of the sixth aspect of the present technique in which the clock-input and interrupt-output control unit controls the peripheral device to shift to a power saving operation state when the reference clock signal input using the differential signal lines becomes undetectable.

This peripheral device can shift to the power saving operation mode promptly after the clock signal provided from the host device is stopped.

A tenth aspect of the present technique provides a communication system including a host device, a peripheral device, and a data line and differential signal lines enabling communication between the host device and the peripheral device. The data line is used to transmit and receive data. The differential signal lines include a first signal line and a second signal line, and are used to transmit a reference clock signal with which data to be transmitted on the data line is synchronized.

The host device includes a differential clock output unit, an interrupt reception unit, an interrupt cancellation unit, and a clock-output and interrupt-reception control unit.

The peripheral device includes a differential clock reception unit, an interrupt generation unit, an interrupt stop unit, and a clock-input and interrupt-output control unit.

The differential clock output unit generates a reference clock signal and outputs the generated reference clock signal onto the differential signal lines.

The interrupt reception unit detects an interrupt signal output from the peripheral device onto the first signal line when an output of the reference clock signal onto the differential signal lines has been stopped.

The interrupt cancelling unit outputs an interrupt cancelling signal onto the second signal line when the interrupt reception unit receives an interrupt from the peripheral device.

The clock-output and interrupt-reception control unit enables the interrupt reception unit to receive a signal input using the first signal line and enables the interrupt cancelling unit to output a signal onto the second signal line when an output of the reference clock signal onto the differential signal lines has been stopped, and controls the differential clock output unit to output a reference clock signal generated by the differential clock output unit onto the differential signal lines when the output of the interrupt signal from the peripheral device is stopped in response to the interrupt cancelling signal output from the interrupt cancelling unit.

The differential clock reception unit receives the reference clock signal.

The interrupt generation unit generates an interrupt signal carrying an interrupt request to be transmitted to the host device using the first signal line when the reference clock signal input using the differential signal lines becomes undetectable.

The interrupt stop unit detects an interrupt cancelling signal transmitted from the host device using the second signal line.

The clock-input and interrupt-output control unit enables the interrupt generation unit to output a signal onto the first signal line and enables the interrupt stop unit to receive a signal input using the second signal line when an input of the reference clock signal using the differential signal lines is stopped, and enables the differential clock reception unit to receive a signal input using the differential signal lines when the interrupt generation unit stops outputting the interrupt signal in response to the interrupt cancelling signal transmitted from the host device.

The communication system has the same advantageous effects as a communication system including the host device of the first aspect of the present technique and the peripheral device of the sixth aspect of the present technique.

An eleventh aspect of the present technique provides a communication system including the host device of one of the first to fifth aspects of the present technique and the peripheral device of one of the sixth to ninth aspects of the present technique.

A twelfth aspect of the present technique provides the communication system of the tenth or eleventh aspect of the present technique in which the host device is a single host device connected to the differential signal lines, and the peripheral device is one of two or more peripheral devices connected to the differential signal lines, and each of the single host device and the two or more peripheral devices is connected to other two of the single host device and the two or more peripheral devices in a ring using the data line.

A thirteenth aspect of the present technique provides the communication system of the tenth or eleventh aspect of the present technique in which the host device is connected to a hub using the differential signal lines and the data line, and the two or more peripheral devices are connected to the hub using the differential signal lines and the data line.

A fourteenth aspect of the present technique provides a communication method used in a communication system including a host device, a peripheral device, and a data line and differential signal lines enabling communication between the host device and the peripheral device. The data line is used to transmit and receive data. The differential signal lines include a first signal line and a second signal line, and are used to transmit a reference clock signal with which data to be transmitted on the data line is synchronized. The communication method includes a differential clock output process, an interrupt reception process, an interrupt cancellation process, a clock-output and interrupt-reception control process, a differential clock reception process, an interrupt generation process, an interrupt stop process, and a clock-input and interrupt-output control process.

Processing Performed by the Host Device

In the differential clock output process, the host device generates a reference clock signal and outputs the generated reference clock signal onto the differential signal lines.

In the interrupt reception process, the host device detects an interrupt signal output from the peripheral device onto the first signal line when an output of the reference clock signal onto the differential signal lines has been stopped.

In the interrupt cancellation process, the host device outputs an interrupt cancelling signal onto the second signal line when receiving an interrupt from the peripheral device.

In the clock-output and interrupt-reception control process, the host device enables a signal to be input from the host device using the first signal line and enables a signal to be output from the host device onto the second signal line when an output of the reference clock signal onto the differential signal lines has been stopped, and outputs a reference clock signal onto the differential signal lines when the output of the interrupt signal from the peripheral device is stopped in response to the interrupt cancelling signal.

Processing Performed by the Peripheral Device

In the differential clock reception process, the peripheral device receives the reference clock signal.

In the interrupt generation process, an interrupt signal carrying an interrupt request to be transmitted to the host device using the first signal line is generated when the reference clock signal input using the differential signal lines becomes undetectable.

In the interrupt stop process, the peripheral device detects an interrupt cancelling signal transmitted from the host device using the second signal line.

In the clock-input and interrupt-output control process, the peripheral device enables a signal to be output onto the first signal line and enables a signal to be input using the second signal line when an input of the reference clock signal using the differential signal lines is stopped, and enables the peripheral device to receive a signal input using the differential signal lines when the peripheral device stops outputting the interrupt signal in response to the interrupt cancelling signal transmitted from the host device.

This communication method enables a signal (data) necessary in the interrupt processing to be transmitted and received between the host device and the peripheral device using the differential signal lines when no clock signal is provided on the differential signal lines. As a result, this communication method enables the peripheral device to promptly transmit a request for interrupt processing to the host device when the host device outputs no clock signal, and enables the interrupt processing to be performed.

What is claimed is:

1. A host device that transmits, using differential signal lines including a first signal line and a second signal line, a reference clock signal to be used in transmission and reception of data to and from a peripheral device, the host device comprising:
   a differential clock output unit configured to generate the reference clock signal and output the generated reference clock signal onto the differential signal lines;
   an interrupt reception unit configured to detect an interrupt signal output from the peripheral device onto the first signal line when an output of the reference clock signal onto the differential signal lines has been stopped; and
   a clock-output and interrupt-reception control unit configured to start transmitting, using the differential signal lines, a reference clock signal generated by the differential clock output unit when the interrupt signal becomes undetectable by the interrupt reception unit.

2. A host device that transmits, using differential signal lines including a first signal line and a second signal line, a reference clock signal to be used in transmission and reception of data to and from a peripheral device, the host device comprising:
   a differential clock output unit configured to generate the reference clock signal and output the generated reference clock signal onto the differential signal lines;
   an interrupt reception unit configured to detect an interrupt signal output from the peripheral device onto the first signal line when an output of the reference clock signal onto the differential signal lines has been stopped;

an interrupt cancelling unit configured to output an interrupt cancelling signal onto the second signal line when the interrupt reception unit receives an interrupt from the peripheral device; and a clock-output and interrupt-reception control unit configured to enable the interrupt reception unit to receive a signal input using the first signal line and enable the interrupt cancelling unit to output a signal onto the second signal line when an output of the reference clock signal onto the differential signal lines has been stopped, and configured to control the differential clock output unit to output a reference clock signal generated by the differential clock output unit onto the differential signal lines when the output of the interrupt signal from the peripheral device is stopped in response to the interrupt cancelling signal output from the interrupt cancelling unit.

3. The host device according to claim 2, wherein the clock-output and interrupt-reception control unit transmits a command inquiring a cause of an interrupt to the peripheral device using a data signal line for transmitting and receiving data in synchronization with the reference clock signal when the clock-output and interrupt-reception control unit controls the differential clock output unit to start outputting the reference clock signal and enables the host device to communicate with the peripheral device.

4. The host device according to claim 2, wherein
the clock-output and interrupt-reception control unit controls the differential clock output unit to output a reference clock signal generated by the differential clock output unit onto the differential signal lines after the interrupt cancelling unit outputs an interrupt cancelling signal onto the second signal line for a predetermined period of time when an output of the reference clock signal onto the differential signal lines has been stopped and no interrupt signal is detected by the interrupt reception unit.

5. The host device according to claim 2, wherein
the clock-output and interrupt-reception control unit controls the output of the reference clock signal to be stopped in a power saving operation of the host device, enables the interrupt reception unit to receive a signal input using the first signal line, and enables the interrupt cancelling unit to output a signal onto the second signal line.

6. A peripheral device that receives, using differential signal lines including a first signal line and a second signal line, a reference clock signal to be used in transmission and reception of data to and from a host device, the peripheral device comprising:

a differential clock reception unit configured to receive the reference clock signal;

an interrupt generation unit configured to generate an interrupt signal carrying an interrupt request to be transmitted to the host device using the first signal line when the reference clock signal input using the differential signal lines becomes undetectable;

an interrupt stop unit configured to detect an interrupt cancelling signal transmitted from the host device using the second signal line; and a clock-input and interrupt-output control unit configured to enable the interrupt generation unit to output a signal onto the first signal line and enable the interrupt stop unit to receive a signal input using the second signal line when an input of the reference clock signal using the differential signal lines is stopped, and enable the differential clock reception unit to receive a signal input using the differential signal lines when the interrupt generation unit stops outputting the interrupt signal in response to the interrupt cancelling signal transmitted from the host device.

7. The peripheral device according to claim 6, wherein the peripheral device receives a command inquiring a cause of an interrupt transmitted from the host device after the clock-input and interrupt-output control unit enables the differential clock reception unit to receive a reference clock signal, and transmits a response containing information identifying the cause of the interrupt generated in accordance with the command to the host device using a data signal line for transmitting and receiving data in synchronization with the reference clock signal.

8. The peripheral device according to claim 6, wherein
when an input of the reference clock signal has been stopped and the interrupt stop unit detects an interrupt cancelling signal transmitted from the host device, the clock-input and interrupt-output control unit enables the differential clock reception unit to receive a reference clock signal using the differential signal lines within a predetermined period of time from when the interrupt cancelling signal is detected.

9. The peripheral device according to claim 6, wherein
the clock-input and interrupt-output control unit controls the peripheral device to shift to a power saving operation state when the reference clock signal input using the differential signal lines becomes undetectable.

10. A communication system comprising a host device, a peripheral device, and a data line and differential signal lines enabling communication between the host device and the peripheral device, the data line being used to transmit and receive data, the differential signal lines including a first signal line and a second signal line and being used to transmit a reference clock signal with which data to be transmitted on the data line is synchronized, the host device including:
a differential clock output unit configured to generate the reference clock signal and output the generated reference clock signal onto the differential signal lines;

an interrupt reception unit configured to detect an interrupt signal output from the peripheral device onto the first signal line when an output of the reference clock signal onto the differential signal lines has been stopped;

an interrupt cancelling unit configured to output an interrupt cancelling signal onto the second signal line when the interrupt reception unit receives an interrupt from the peripheral device; and a clock-output and interrupt-reception control unit configured to enable the interrupt reception unit to receive a signal input using the first signal line and enable the interrupt cancelling unit to output a signal onto the second signal line when an output of the reference clock signal onto the differential signal lines has been stopped, and configured to control the differential clock output unit to output a reference clock signal generated by the differential clock output unit onto the differential signal lines when the output of the interrupt signal from the peripheral device is stopped in response to the interrupt cancelling signal output from the interrupt cancelling unit, and the peripheral device including:
a differential clock reception unit configured to receive the reference clock signal;

an interrupt generation unit configured to generate an interrupt signal carrying an interrupt request to be transmitted to the host device using the first signal line when the reference clock signal input using the differential signal lines becomes undetectable;

an interrupt stop unit configured to detect an interrupt cancelling signal transmitted from the host device using the second signal line; and a clock-input and interrupt-output control unit configured to enable the interrupt generation unit to output a signal onto the first signal line and enable the interrupt stop unit to receive a signal input using the second signal line when an input of the reference clock signal using the differential signal lines is stopped, and enable the differential clock reception unit to receive a signal input using the differential signal lines when the interrupt generation unit stops outputting the interrupt signal in response to the interrupt cancelling signal transmitted from the host device.

11. A communication system, comprising:

the host device according to claim 1; and a peripheral device that receives, using differential signal lines including a first signal line and a second signal line, a reference clock signal to be used in transmission and reception of data to and from the host device, the peripheral device including:

a differential clock reception unit configured to receive the reference clock signal;

an interrupt generation unit configured to generate an interrupt signal carrying an interrupt request to be transmitted to the host device using the first signal line when the reference clock signal input using the differential signal lines becomes undetectable;

an interrupt stop unit configured to detect an interrupt cancelling signal transmitted from the host device using the second signal line; and a clock-input and interrupt-output control unit configured to enable the interrupt generation unit to output a signal onto the first signal line and enable the interrupt stop unit to receive a signal input using the second signal line when an input of the reference clock signal using the differential signal lines is stopped, and enable the differential clock reception unit to receive a signal input using the differential signal lines when the interrupt generation unit stops outputting the interrupt signal in response to the interrupt cancelling signal transmitted from the host device.

12. The communication system according to claim 10, wherein the host device is a single host device connected to the differential signal lines, and the peripheral device is one of two or more peripheral devices connected to the differential signal lines, and each of the single host device and the two or more peripheral devices is connected to other two of the single host device and the two or more peripheral devices in a ring using the data line.

13. The communication system according to claim 10, wherein the host device is connected to a hub using the differential signal lines and the data line, and the two or more peripheral devices are connected to the hub using the differential signal lines and the data line.

14. A communication method used in a communication system comprising a host device, a peripheral device, and a data line and differential signal lines enabling communication between the host device and the peripheral device, the data line being used to transmit and receive data, the differential signal lines including a first signal line and a second signal line used to transmit a reference clock signal with which data to be transmitted on the data line is synchronized, the method comprising:

generating the reference clock signal and outputting the generated reference clock signal onto the differential signal lines, the step of generating and outputting the reference clock signal being performed by the host device;

detecting an interrupt signal output from the peripheral device onto the first signal line when an output of the reference clock signal onto the differential signal lines has been stopped;

outputting an interrupt cancelling signal onto the second signal line when receiving an interrupt from the peripheral device, the step of outputting the interrupt cancelling signal being performed by the host device; and enabling a signal to be input from the host device using the first signal line and enabling a signal to be output from the host device onto the second signal line when an output of the reference clock signal onto the differential signal lines has been stopped, and outputting a reference clock signal onto the differential signal lines when the output of the interrupt signal from the peripheral device is stopped in response to the interrupt cancelling signal, the step of enabling the signal input and output and outputting the reference clock signal being performed by the host device;

receiving the reference clock signal, the step of receiving the reference clock signal being performed by the peripheral device;

generating an interrupt signal carrying an interrupt request to be transmitted to the host device using the first signal line when the reference clock signal input using the differential signal lines becomes undetectable;

detecting an interrupt cancelling signal transmitted from the host device using the second signal line, the step of detecting the interrupt cancelling signal being performed by the peripheral device; and enabling a signal to be output onto the first signal line and enabling a signal to be input using the second signal line when an input of the reference clock signal using the differential signal lines is stopped, and enabling the peripheral device to receive a signal input using the differential signal lines when the peripheral device stops outputting the interrupt signal in response to the interrupt cancelling signal transmitted from the host device, the step of enabling the signal output and input and outputting the interrupt signal being performed by the peripheral device.

* * * * *